No. 704,066. Patented July 8, 1902.
M. W. MARSDEN.
BUILDING MATERIAL.
(Application filed Sept. 24, 1901.)
(No Model.) 2 Sheets—Sheet 1.
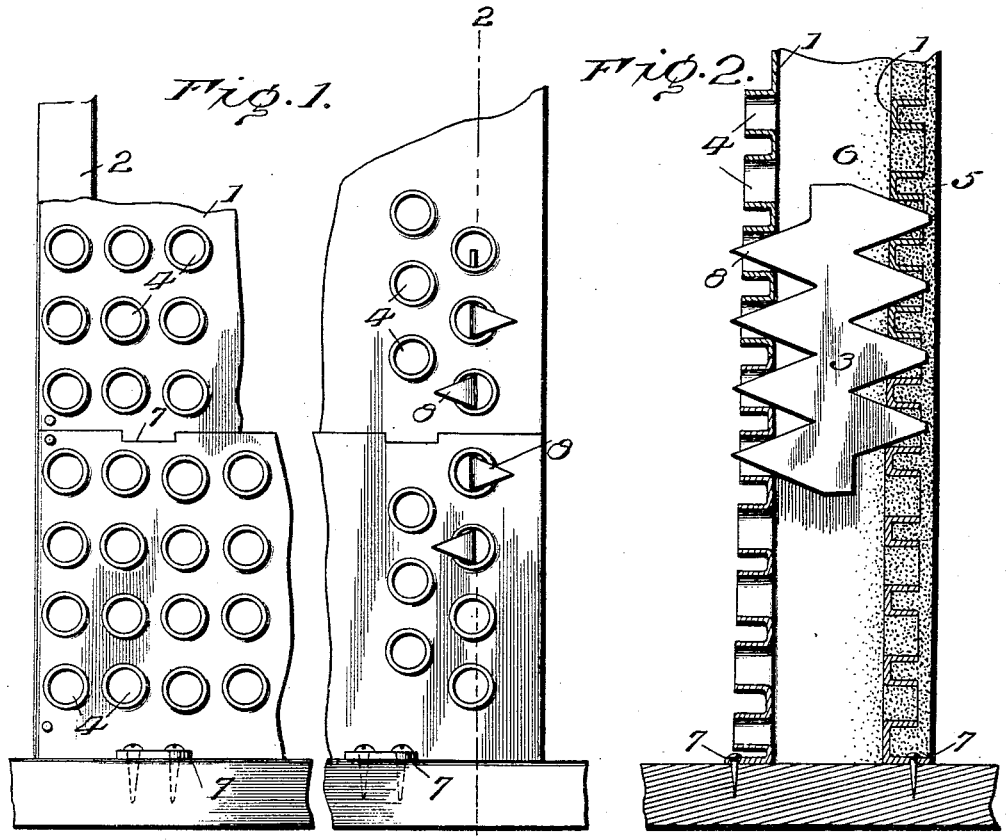
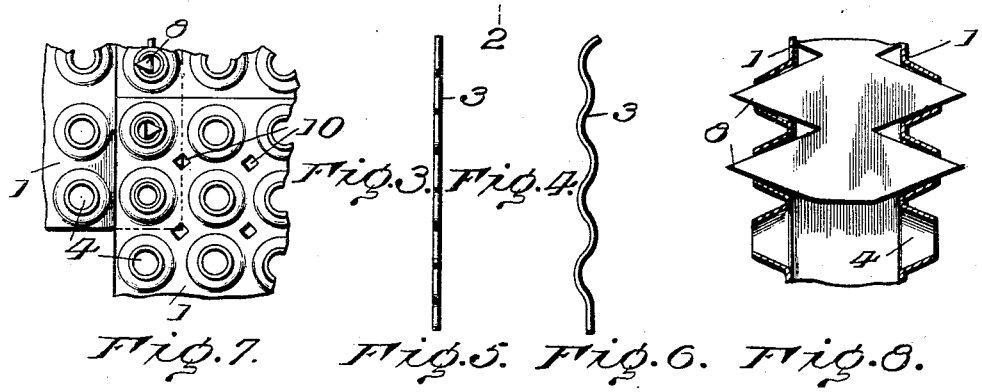
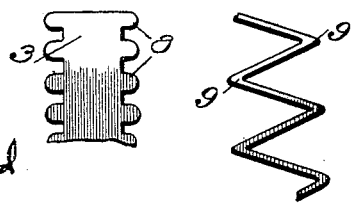
Inventor
Mark W. Marsden
By Augustus B. Stoughton
Attorney No. 704,066. Patented July 8, 1902.
M. W. MARSDEN.
BUILDING MATERIAL.
(Application filed Sept. 24, 1901.)
(No Model.) 2 Sheets—Sheet 2.

Witnesses
Inventor
Mark W. Marsden
By Augustus B. Houghton
Attorney

UNITED STATES PATENT OFFICE.

MARK W. MARSDEN, OF PHILADELPHIA, PENNSYLVANIA.

BUILDING MATERIAL.

SPECIFICATION forming part of Letters Patent No. 704,066, dated July 8, 1902.

Application filed September 24, 1901. Serial No. 76,351. (No specimens.)

*To all whom it may concern:*

Be it known that I, MARK W. MARSDEN, a citizen of the United States, residing at Philadelphia, in the county of Philadelphia, State of Pennsylvania, have invented certain new and useful Improvements in Building Material, of which the following is a specification.

My invention relates to fireproof material for building purposes, and has for one object to provide a fireproof material which shall be comparatively inexpensive, light, strong, easily erected, and well adapted for the reception of plaster.

Further, the invention has for an object to provide a perfect substitute for sheet-metal plates, laths, and such like plaster-sustaining means and which will be advantageous in respect to the metal in that it is less expensive and more easily worked.

A still further object of the invention is to provide a fibrous sheet or plate which may be suitably perforated or otherwise arranged to provide pockets or shelves into or through which the plaster may key, and thus firmly support the body.

The nature, characteristic features, and scope of the invention will be more fully understood from the following description, taken in connection with the accompanying drawings, forming a part hereof, and in which—

Figure 1 illustrates a partition or wall constructed of perforated fibrous sheets made in accordance with my invention. Fig. 2 is a sectional view taken on line 2 2 of Fig. 1. Figs. 3, 4, 5, and 6 illustrate tie or distance pieces. Figs. 7 and 8 are respectively face and sectional views illustrating a modification. Figs. 9 to 16 illustrate varied types of fibrous sheets or plates.

In practicing my invention I employ any suitable fibrous material. I have obtained excellent results by the use of cardboard or asbestos, but of course do not confine myself to such materials and merely mention them as examples. For example, I take a very tough and strong cardboard and treat it with a solution of silicate of soda and sulfate of magnesia. Asbestos or other fibrous material may be treated or impregnated in a like manner. While asbestos is from its nature incombustible, the silicate of soda and sulfate of magnesia when present are not superfluous, as they at first soften and then cause the fibrous sheets to set, which is desirable in making special shapes or forms. By this treatment the sheets 1 are made fireproof, are given increased tenacity, and obviously become more burden-bearing. I then apply a coat of asphaltum varnish or other suitable waterproof paint or varnish. When dry, the sheets may be cut up into various shapes and sizes and perforated or otherwise arranged for the reception of plaster or the like.

Fig. 1 illustrates a partition or wall without plaster and constructed of perforated fibrous sheets or plates 1, which have been previously prepared as described. These sheets or plates 1 may simply be nailed to the studding 2, as shown to the left in Fig. 1, or the plates may be secured by means of tie or distance pieces 3, which penetrate the perforations 4 and are bent over to clench the same. This is more clearly shown in Fig. 2, where 5 indicates plaster and the space 6 may be filled with any suitable incombustible material, if desired. The fibrous sheets 1 may be provided at one edge with an overlapping tongue 7, as in Fig. 1, and the tongues of the lowermost sheets may be bent at right angles to the sheets and by tacking them to the floor serve to rigidly secure the partition or wall. The distance or tie pieces 3, which may be of metal or of fibrous material, as may be desired, may have teeth 8, which penetrate the perforations of the plates, as already explained, or the tie-pieces may consist of a wire member, Fig. 6, having points 9, adapted to enter openings or spaces provided in the fibrous plates. In Fig. 4 the distance-piece is shown as being corrugated.

In Fig. 7, 10 represents additional openings which may be provided in the sheets or plates 1. Said plates are also shown as overlapping at their edges and secured by teeth 8.

Figure 14:
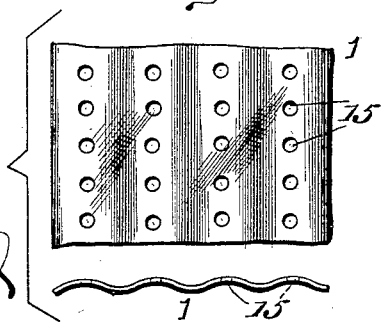

In the construction Fig. 14 the fibrous sheet 1 is corrugated or ribbed and provided with circular perforations 15.

Figure 9:
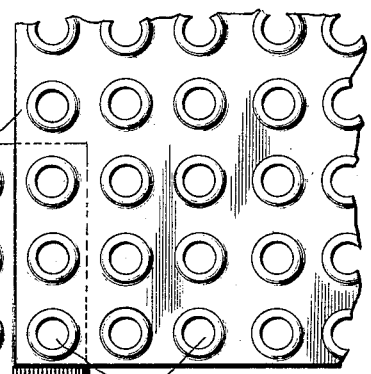
Fig. 9 shows the mode of overlapping adjoining plates provided with circular perforations having flanges of the form of truncated cones or frustums, as in Fig. 10. In the latter figure, 11 indicates the flanges, the burs 12 of which are directed inward.
Figure 16:
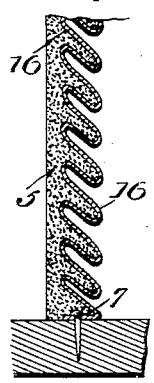
Figure 15:
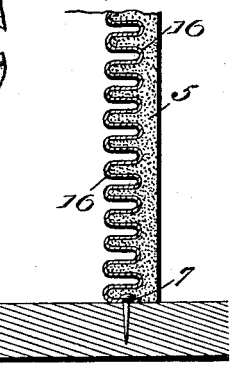
Figure 10:
Figure 12:
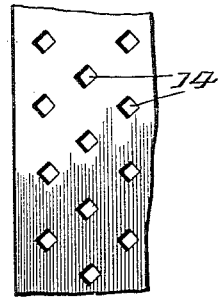
Fig. 12 shows perforations of square or rhomboid shape, as at 14, and in Fig. 13 the sheets are punched up so as to provide them with tangs 15, which assume the positions shown.
Figure 11:
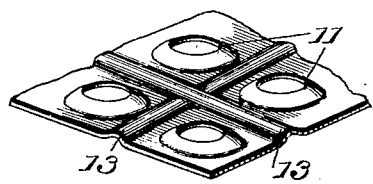
Fig. 11 shows a fibrous plate or sheet having perforations similar to those shown in Figs. 9 and 10 and provided with ribs 13, extending parallel and at right angles to each other.
Figure 13:
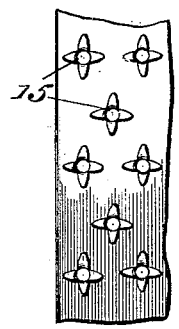

In Figs. 15 and 16 the fibrous sheets are fluted. In the former figure the flutings 16 extend horizontally, and in the latter figure they are inclined upward, so as to provide interstices, wells, or pockets for the reception of the plaster.

It will be obvious to those skilled in the art to which the invention appertains that modifications may be made in details without departing from the spirit and scope of the same. Hence I do not limit myself to the precise construction and arrangement of parts hereinabove described, and illustrated in the accompanying drawings; but, Having described the nature and objects of the invention, what I claim as new, and desire to secure by Letters Patent, is—

1. Material for building purposes, consisting of fibrous sheets or plates impregnated with a solution of silicate of soda and sulfate of magnesia and adapted and arranged for the reception of plaster.

2. Material for building purposes, consisting of fibrous sheets or plates impregnated with a solution of silicate of soda and sulfate of magnesia and waterproofed.

3. Material for building purposes consisting of fibrous sheets or plates impregnated with a solution of silicate of soda and sulfate of magnesia and coated with a waterproof compound, and adapted and arranged for the reception of plaster.

4. Material for building purposes, consisting of fibrous sheets or plates impregnated with a solution of silicate of soda and sulfate of magnesia and coated with a waterproof compound, said sheets or plates having spaces for the reception of plaster.

5. Material for building purposes consisting of fibrous sheets or plates impregnated with a solution of silicate of soda and sulfate of magnesia and coated with a waterproof compound, said sheets or plates having perforations for the reception of plaster.

6. A partition, ceiling or wall, consisting of sidings, which are separated by an air-space and composed of fire and water proof fibrous sheets or plates which are perforated for the reception of plaster, and provided at their edges with tongues, which overlap the edges of adjoining plates, and tie or distance pieces extending transversely of said air-space and rigidly connecting said sidings, substantially as described.

7. A partition, ceiling or wall, consisting of fibrous sheets or plates impregnated with a solution of silicate of soda and sulfate of magnesia and coated with a waterproof compound and adapted and arranged for the reception of plaster, and a layer of plaster applied to said plates.

8. A partition or wall, consisting of fibrous sheets or plates perforated and impregnated with a solution of silicate of soda and sulfate of magnesia and coated with a waterproof compound, and plaster applied to said plates and keying through the perforations.

9. A partition or the like consisting of fibrous sheets or plates perforated and impregnated with a solution of silicate of soda and sulfate of magnesia and coated with a waterproof compound, tie or distance pieces for spacing said plates, and plaster applied to said plates and keying through the perforations.

10. A partition, ceiling or like construction, consisting of overlapping fibrous plates impregnated with a solution of silicate of soda and sulfate of magnesia, and adapted and arranged for the reception of plaster.

11. A partition, ceiling or wall, consisting of fire and water proof fibrous sheets or plates provided at their edges with tongues, which overlap the edges of adjoining plates, said fibrous sheets or plates having spaces for the reception of plaster, and transversely-extending tie or distance pieces for rigidly securing the plates, substantially as described.

12. A partition, ceiling or like construction, consisting of sidings separated by an air-space and composed of one-ply fire and water proof fibrous sheets or plates perforated for the reception of plaster and provided at their edges with tongues, which overlap the edges of adjoining plates, and tie or distance pieces extending transversely of said air-space and rigidly connecting the sidings, substantially as described.

In testimony whereof I have hereunto signed my name in the presence of two subscribing witnesses.

MARK W. MARSDEN.

Witnesses:
W. J. JACKSON,
JAS. A. RICHMOND.